Feb. 12, 1929.
C. M. WILLS
VISIONLESS VENTILATOR
Filed March 31, 1928
1,701,993
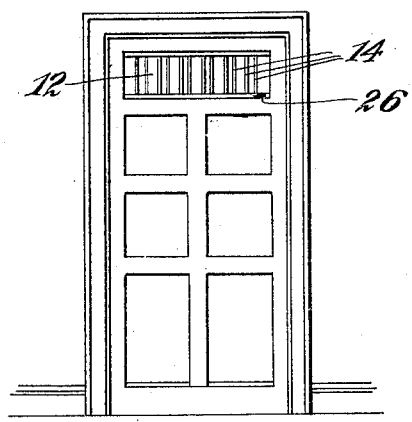
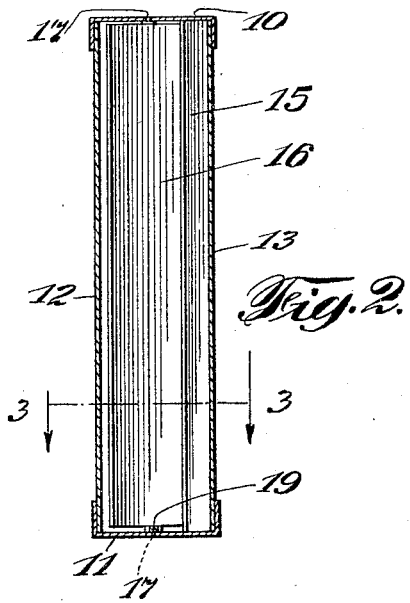
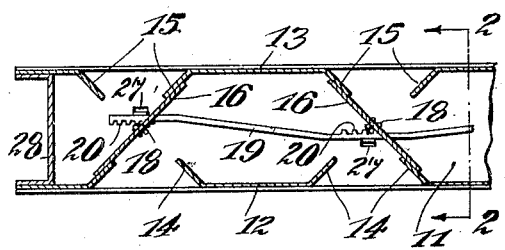
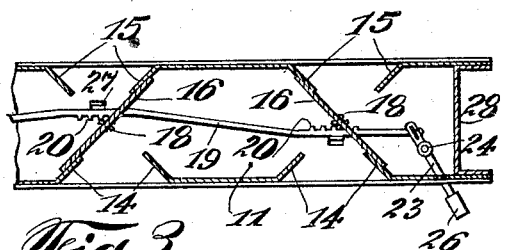
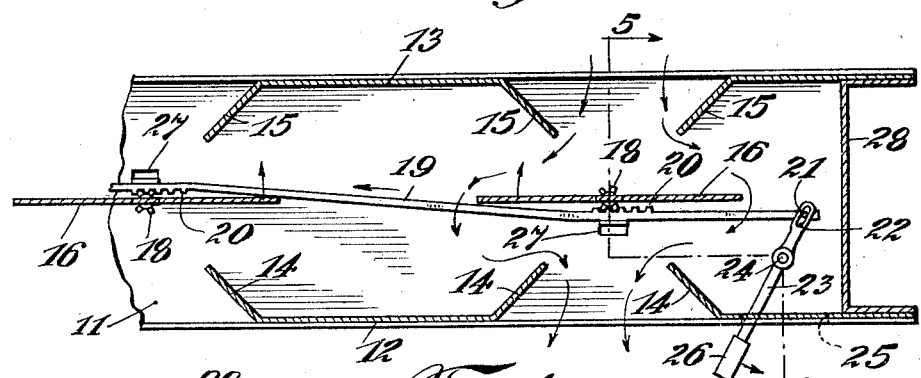
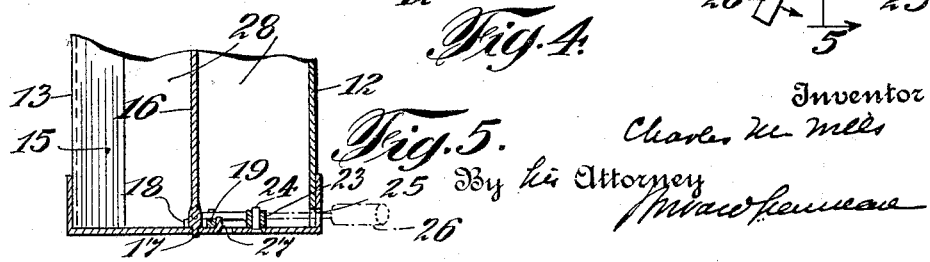

Patented Feb. 12, 1929.

1,701,993

UNITED STATES PATENT OFFICE.

CHARLES M. WILLS, OF ATLANTIC CITY, NEW JERSEY, ASSIGNOR TO THE AMERICAN TRANSOM CO., INC., OF PHILADELPHIA, PENNSYLVANIA, A CORPORATION OF PENNSYLVANIA.

VISIONLESS VENTILATOR.

Application filed March 31, 1923. Serial No. 266,262.

My invention relates to ventilators and refers particularly to ventilators through which vision is always prevented and through which the passage of air may be allowed or prevented.

It is usually desirable that ventilators, particularly those adapted for door transoms be of such construction that while the free passage of air therethrough may be allowed and prevented as desired, the passage of light and vision should be impossible at all times.

The device of my invention accomplishes these desirable objects in a most effective and simple manner.

In the accompanying drawings illustrating one form of the device of my invention similar parts are designated by similar numerals.

Figure 1 is a door with my device installed as a transom.

Figure 2 is a vertical section of my device in closed position taken through the line 2—2 of Figure 3.

Figure 3 is a section through the line 3—3 of Figure 2.

Figure 4 is an enlarged view of a portion of Figure 3 with the device in open position.

Figure 5 is a section through the line 5—5 of Figure 4.

The particular form of the device of my invention shown in the accompanying drawings comprises a casing having the channel-shaped top 10, bottom 11, the sides 12 and 13 and the ends 28.

The side 12 has a plurality of vertical openings formed by the inturned wings 14, 14 and the side 13 has a plurality of similar vertical openings formed by the inturned wings 15, 15, the openings being positioned opposite each other. These wings extend from the inner face of the top 10 but are spaced slightly from the bottom 11.

A plurality of shutters 16, 16, are pivotally mounted opposite the side openings by means of the pivots 17, 17, to the top 10 and the bottom 11.

Each bottom pivot 17 carries a fixedly attached pinion 18.

A slidable bent rod 19 passes longitudinally of the device and has oppositely positioned racks 20, 20 meshing with the pinions 18, 18.

One end of the rod 19 carries a pin 21 movable within the slot 22 of the arm 23, the latter being pivotally fixed at 23 and extending outwardly of the side 12 through the slot 25 and having a handle 26 on the extended end.

The rod 19 is maintained in position by the guides 27, 27, which are the cut and upturned portions of the bottom 11.

When the device is in the position shown in Figure 4, air can pass through it freely as indicated by the arrows, but vision therethrough is prevented by the shutters 16, 16.

If now the handle 26 be moved into the position shown in Figure 3, the shutters 16, 16, will be brought into abutment with the wings 14, 14, 15, 15 and both the passage of air and vision will be prevented.

It will thus be seen that my device presents an effective and simple ventilator through which vision will always be prevented and through which the passage of air may be allowed or prevented as desired.

I do not limit myself to the particular size, shape, number or arrangement of parts as shown and described, as these are given simply as a means for clearly describing the device of my invention.

What I claim is:—

1. In a visionless ventilator, in combination, a casing having a top, a bottom, two ends and two sides, each side having a plurality of vertical openings, the openings in the two sides being in opposite alignment with each other; a wing extending inwardly from each side margin of each opening; a plurality of pivotal shutters positioned in alignment with said openings capable of abutment with opposite wings and means exterior of the device whereby the shutters may be moved from abutment to non-abutment with opposite wings.

2. In a visionless ventilator, in combination, a casing having a top, a bottom, two ends and two sides, each side having a plurality of vertical openings, the openings in the two sides being in opposite alignment with each other; a wing extending inwardly from each side margin of each opening; a plurality of pivotal shutters positioned in alignment with said openings capable of abutment with opposite wings, a pinion carried by each shutter; a rod extending longitudinally of the device; a plurality of racks carried by said rod, each rack meshing with a pinion, and means exterior of the device whereby the shutters may be revolved into abutment and non-abutment position with opposite wings.

3. In a visionless ventilator, in combination, a casing having a top, a bottom, two ends and two sides, each side having a plurality of vertical openings, the openings in the two sides being in opposite alignment with each other; a wing extending inwardly from each side margin of each opening; a plurality of pivotal shutters positioned in abutment with said openings capable of abutment with opposite wings, a pinion carried by each shutter; a rod extending longitudinally of the device; a plurality of racks carried by said rod, each rack meshing with a pinion and means exterior of the device which the shutter may be revolved oppositely with respect to each other and into abutment and non-abutment position with opposite wings.

4. In a visionless ventilator, in combination, a casing having a top, a bottom, two ends and two sides, each side having a plurality of vertical openings, the openings in the two sides being in opposite alignment with each other; a wing extending inwardly from each side margin of each opening; a plurality of pivotal shutters positioned in alignment with said openings capable of abutment with opposite wings, a pinion carried by each shutter; a rod extending longitudinally of the device; a plurality of racks carried by said rod, each rack meshing with a pinion, a pivoted arm movably attached to said rod and extending outwardly of the device, the movement of said arm causing the shutters to revolve in opposite directions with respect to each other and causing said shutters to move from non-abutment to abutment with opposite wings.

Signed at Philadelphia in the county of Philadelphia and State of Pennsylvania, this 29 day of March, 1928.

CHARLES M. WILLS.